Feb. 20, 1968 T. C. GERNER 3,369,848
ANCHOR END PIVOTAL CONNECTION FOR IDLER ARMS
Filed July 8, 1966 4 Sheets-Sheet 1
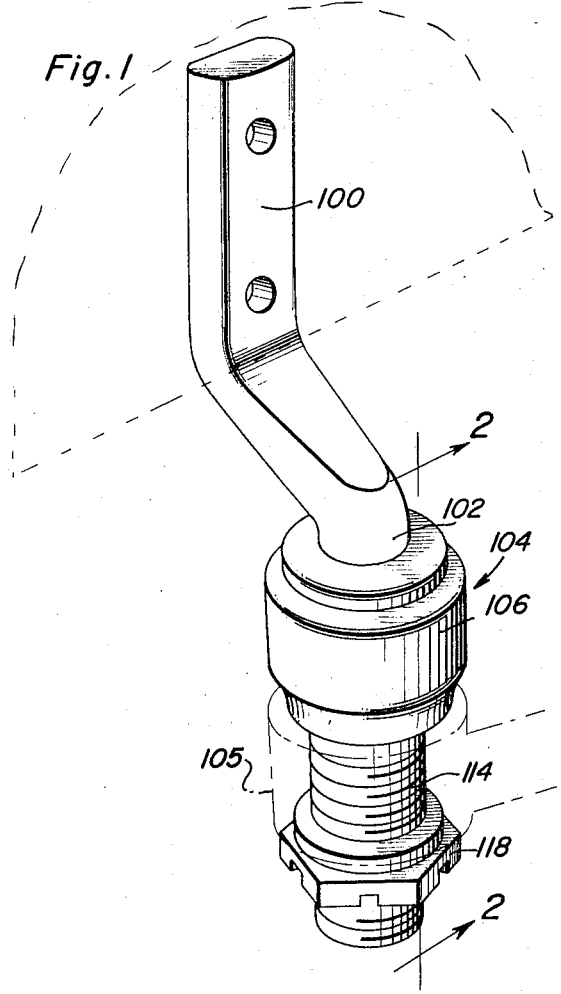
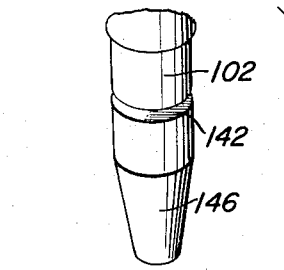
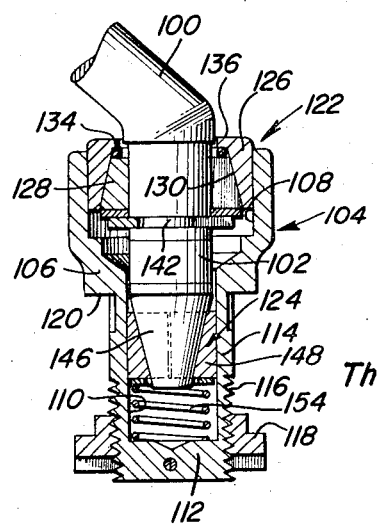
INVENTOR.
Theodore C. Gerner Feb. 20, 1968　　　　T. C. GERNER　　　　3,369,848
ANCHOR END PIVOTAL CONNECTION FOR IDLER ARMS
Filed July 8, 1966　　　　　　　　　　4 Sheets-Sheet 2
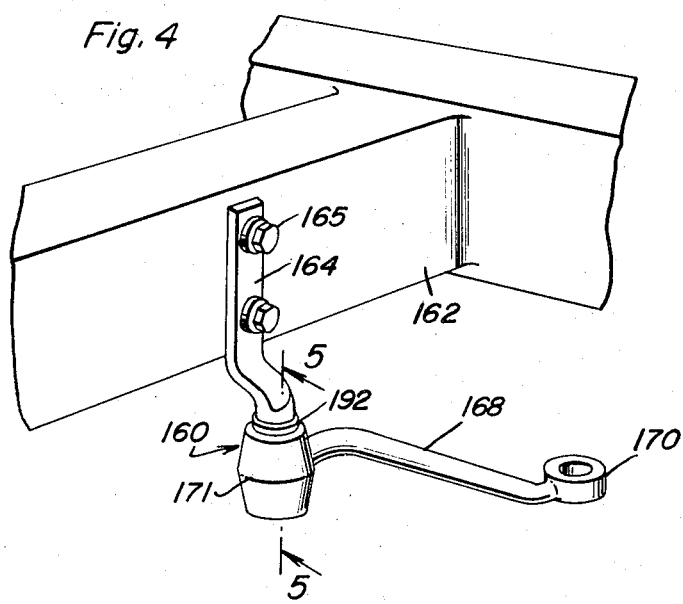
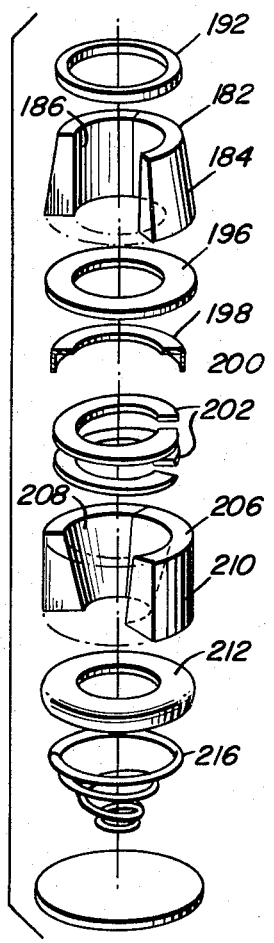
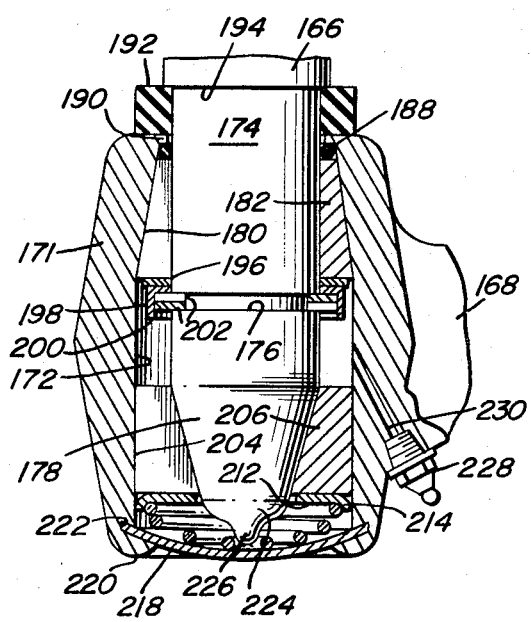
Theodore C. Gerner
INVENTOR.

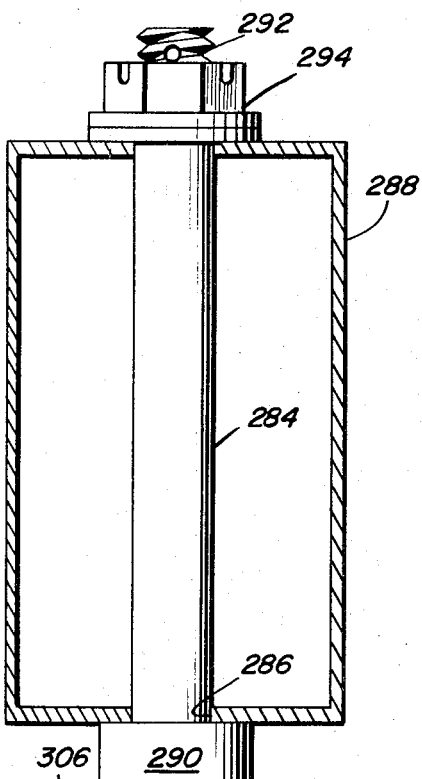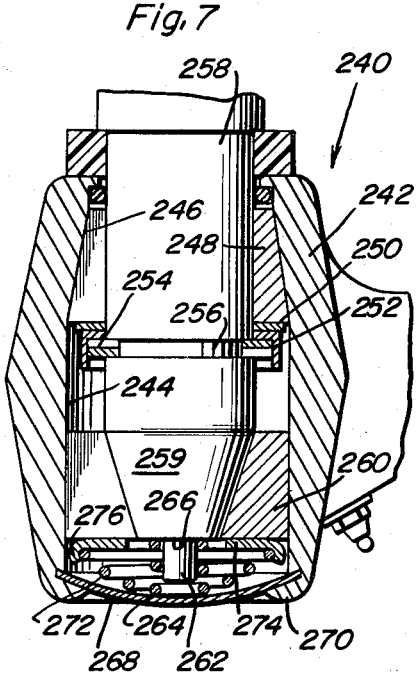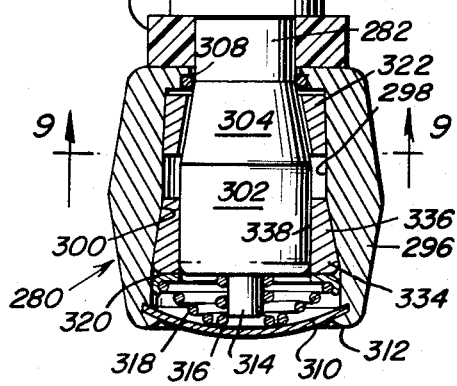

Feb. 20, 1968     T. C. GERNER     3,369,848
ANCHOR END PIVOTAL CONNECTION FOR IDLER ARMS
Filed July 8, 1966     4 Sheets-Sheet 4
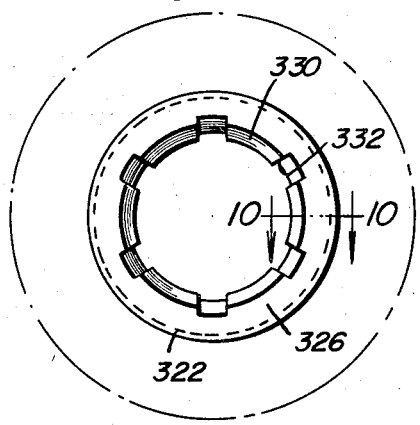
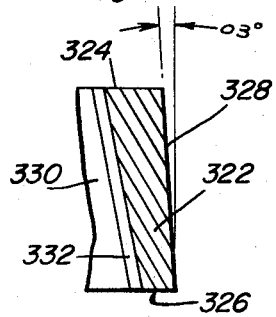
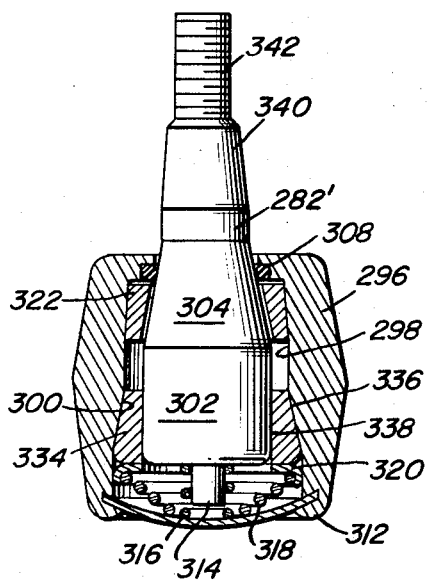
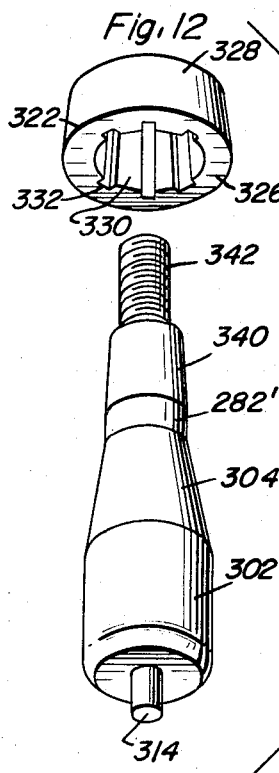
Theodore C. Gerner
INVENTOR.

United States Patent Office 3,369,848
Patented Feb. 20, 1968

3,369,848
ANCHOR END PIVOTAL CONNECTION FOR IDLER ARMS
Theodore C. Gerner, 1800 S. Broadway,
Oklahoma City, Okla. 73109
Continuation-in-part of application Ser. No. 246,631, Dec. 21, 1962. This application July 8, 1966, Ser. No. 573,730
6 Claims. (Cl. 308—71)

ABSTRACT OF THE DISCLOSURE

An idler arm end bracket for use in the steering linkage of an automative vehicle including a housing with a female bore therethrough and a male pin extending into the bore and being journaled in relation thereto by spaced wedge means having bearing contact with the pin and wedging contact with the bore. Spring means is associated with the wedge means to automatically compensate for and eliminate looseness caused by wear, imprecision and shock. The spring means engages one of the wedge means and serves to exert an axial force for retaining the other wedge means in biased engagement between the bore and pin.

---

This application is a continuation-in-part of copending application Ser. No. 246,631, for Idler Arm Repair Bushing filed Dec. 21, 1962, now Patent No. 3,273,946 issued Sept. 20, 1966.

The present invention generally relates to an anchor end or frame bracket end for idler arms for use in the steering linkage of an automobile vehicle.

An object of the present invention is to provide an anchor end pivotal connection for an idler arm of an automotive steering linkage to enable relative movement between the idler arm and an anchor bracket for supporting the anchor end of the idler arm from a support member and has specific structural features incorporated therein to enable any wear occurring to be automatically compensated for and to enable the components to shift or move slightly under impact forces or shock and immediately return to their position thus providing an anchor end pivotal connection which not only automatically compensates for wear but also automatically compensates for any excessive shock forces or impulses imparted thereto by the steering linkage of the automotive vehicle.

Another important object of the present invention is to provide an anchor end pivotal connection in accordance with the preceding objects which includes a spindle or pin received in a housing with wedge elements orientated between the spindle or pin and housing with all of the components having cooperating surfaces and are resiliently urged into cooperating relationship to compensate for or take up slack caused by wear and also to enable movement of the components in relation to each other to not only permit normal operation of the idler arm but also to enable shock loads imparted thereto to be compensated for and to permit limited movement of the components after which the components return to their normal position with the structure being related in such a manner to provide an accurate and positive support for the anchor end of the idler arm.

A still further object of the present invention is to provide an anchor end pivotal connection for idler arm which provides an automatic slack or wear take-up means to minimize or obviate lost motion in the pivotal connection due to the development of wear and looseness or play with the pivotal connection being quite compact in construction and easily applied to or removed as a unit and may be either used as original equipment or as a replacement component with the structure being relatively inexpensive to manufacture and maintain and is especially accurate, dependable and long lasting.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a perspective view of the frame bracket and an anchor end pivotal connection incorporated therein for an idler arm constructed in accordance with the present invention and with the idler arm shown in broken lines;

FIGURE 2 is a vertical sectional view taken substantially upon a plane passing upon section line 2—2 of FIGURE 1;

FIGURE 3 is an exploded perspective view, with portions thereof omitted for clarity illustrating the various components of the anchor end pivotal connection and their relative positions when assembled;

FIGURE 4 is a perspective view of another embodiment of the anchor end pivotal connection for the idler arm;

FIGURE 5 is a vertical sectional view taken substantially upon a plane passing along section line 5—5 of FIGURE 4 illustrating further structural details of the interior of the pivotal connection between the idler arm and frame bracket;

FIGURE 6 is an exploded group perspective view of the components of the anchor end pivotal connection illustrated in FIGURES 4 and 5;

FIGURE 7 is a vertical sectional view of a structure similar to FIGURE 5 but illustrating two separate springs employed for retaining the pin and wedge elements in cooperating relationship;

FIGURE 8 is a vertical sectional view illustrating an embodiment of the invention having an elongated pin extending through a frame element of the vehicle;

FIGURE 9 is a transverse, sectional view taken substantially upon a plane passing along section line 9—9 of FIGURE 8 illustrating further structural details of the pivot connection at the anchor end of the idler arm;

FIGURE 10 is a detail sectional view, on an enlarged scale, taken along section line 10—10 of FIGURE 9 illustrating further specific structural details of the upper wedge element;

FIGURE 11 is a vertical sectional view of a structure of the pivotal connection similar to that illustrated in FIGURE 8 but with a short mounting pin; and FIGURE 12 is an exploded perspective view illustrating the relationship of the mounting pin and upper annular wedge element.

Referring to FIGURES 1-3 of the drawings, there is shown an anchor 100 adapted to be supported from a frame component of the vehicle in a conventional manner. The anchor 100 has a depending extremity 102 in the form of a pin or spindle. This extremity pivotally supports the anchor end of an idler arm 105 by a pivotal connection assembly indicated generally by the numeral 104.

The pivotal connection assembly 104 includes a generally cylindrical vertically elongated housing 106 open at its upper end and providing a diametrically enlarged chamber 108 thereon. At its lower end, the housing 106 is provided with an axial bore 110 therein which terminates in a closed bottom wall 112 of the housing. The lower diametrically reduced end portion of the housing indicated by the numeral 114 is externally threaded at 116 for the reception of a locking nut 118 thereon. The locking nut 118 cooperates with an annular shoulder 120 formed at the junction of the upper portion of the housing 106 with the diametrically reduced portion 114 to clamp the anchor end of an idler arm therebetween.

Received within the housing 106 is a slack take-up bearing assembly. This assembly includes upper and lower bearing units designated generally by numeral 122 and 124 respectively. The upper unit consists of an inverted cup-like member 126 having a conical surface 130 therein. Engaged with the surface 130 are a plurality of wedge means or elements 128 which as shown in FIGURE 3 comprise circumferentially extending arcuate elements having exterior surfaces 132 which engage and cooperate with the surface 130 of the cup member 126. A sealing ring 134 is interposed between the inturned flange 136 of the cup member 126 and the upper ends of the plurality of wedge elements 128 to effect a seal for the upper end of the upper bearing assembly. A metallic washer 138 underlies the flat surfaces of the lower ends of the wedge elements 128 and is retained in place by a horseshoe washer 140 engaged upon a diametrically reduced portion 142 intermediate the ends of the anchor pin 102.

The latter terminates at its lower end in a conical downwardly convergent lower end portion 146 which defines generally a frustoconical bearing surface about which are engaged a further set of wedge elements 148. The wedge means or wedge elements 148 likewise have internal conical bearing surfaces 150 which cooperate with the conical surface of the lower end portion 146 of the anchor pin 102. A thrust washer 152 abuts against the flat bottom surfaces of the wedge elements 148 and a spring 154 bears against the washer 152 and the inner surface of the bottom wall 112 of the housing thus yieldingly urging the wedge elements 148 in an upward direction. This urging of the lower set of wedge elements 148 upwardly into wedging contact with the bearing surface 146 will urge the pin 102 and upper wedge elements 128 upwardly into wedging engagement with the surface 130 and cause the wedge elements 128 to move into bearing engagement with the cylindrical external bearing surface on pin 102.

Referring specifically to FIGURES 4–6, the pivotal connection assembly illustrated therein is generally designated by the numeral 160 and is illustrated on a frame cross-member 162 of a motor vehicle frame having an idler arm anchor bracket 164 secured thereto in the usual manner such as by suitable bolts 165 or the like. This bracket 164 terminates in a downwardly extending and offset pin or spindle 166 upon which is journalled an idler arm 168 which has a relay end 170 connected to the steering linkage of the vehicle (not shown), in the usual manner. The idler arm 168 has a vertical housing 171 at the anchor end thereof provided with a bore 172 therethrough in which is received the bearing means by which the idler arm 168 is rotatably journalled upon the anchor bracket 164 and the pin 166. It will be observed that the bore 172 extends entirely through the enlarged housing or anchor end 171 of the idler arm 168.

In this construction, the depending pin or spindle 166 includes a cylindrical bearing surface 174 having an annular groove 176 formed therein which is nearer to the lower end of the cylindrical surface 174 than the upper end. The lower end of the cylindrical surface 174 merges into a continuously varying, inwardly tapering conical bearing surface 178.

The bore 172 through the tubular housing 171 on the end of the idler arm 168 has an upper varying surface which converges and defines a conical engaging surface 180. Interposed between the engaging surface 180 and the cylindrical bearing surface 174, is a plurality of segmental wedge elements or wedges 182 which cooperate to define a conical exterior surface 184 which cooperates with and wedgingly engages the surface 180 with the cylindrical interior bearing surface 186 defined by the cooperating wedges 182 engaging the bearing surface 174. An annular sealing ring such as O-ring seal 188 is interposed between the upper ends of the wedges 182 and an inturned flange 190 on the upper end of the housing 171. A larger sealing member such as a rubber or felt gasket or the like 192 is interposed between the upper end of the housing 171 and a shoulder 194 formed on the depending pin 166 on the anchor bracket 164 to seal the pin or spindle 166 in relation to the housing 171 to prevent entry of dust and the like.

Engaging the lower ends of the wedges 182 is an annular metallic washer 196 which retains all of the wedges 182 in substantially the same vertical position. Disposed against the undersurface of the washer 196 is a cup-shaped retaining ring 198 which has a depending flange 200 at the outer periphery thereof which overlies the groove 176 and receives and retains a pair of split spring washers 202 or a single spiral split spring washer orientated in the groove 176 which serves to urge the ring 198 and washer 196 upwardly in relation to the bearing surface 174 thus retaining the wedges 182 urged upwardly into wedging contact with engaging surface 180 and into bearing contact with bearing surface 174 with the spiral spring enabling a certain degree of resilient axial movement of the wedge elements 182 in relation to the surface 180 and the bearing surface 174.

Interposed between the conical bearing surface 178 and a cylindrical engaging surface 204 in the lower end portion of the bore 172, is a lower set of wedge elements or wedges 206 having an inclined or conical interior bearing surface 208 which cooperates with and engages the bearing surface 178. An exterior surface 210 engages and cooperates with the interior surface 204 on the bore 172. A rigid annular metal washer 212 engages the lower ends of the wedges 206 and the periphery of the washer 212 has a depending flange 214 thereon to engage and center the upper convolution of a spiral coil spring 216 in which the lower convolutions are of less diameter than the upper convolution and which engages and is seated on a retaining disk or plate 218 which is held in place in the bore by an inwardly deformed flange 220 or the like which is swedged over the periphery of the disk after insertion thereof with the disk or plate 218 being received within a peripheral shoulder 222 formed in the bore 172 with the shoulder being, of course, closed when the flange 220 is swedged over the disk or plate 218 which has an inwardly facing concave surface for centering the spiral coil spring 216 in a known manner.

As illustrated in FIGURE 5, the lower end portion of the conical bearing surface 178 is provided with an axial extension 224 of gradually reducing diameter which terminates in a lower projecting end portion 226 which is somewhat spherical in nature and which is received in generally the lowermost convolution of the spiral coil spring 216 which serves to retain an alignment between the spring 216 and the longitudinal axis of the bearing surfaces 174 and 178.

In the bearing assemblies, suitable lubrication fittings 228 may be provided along with lubricating passageways 230 or the like and various other conventional expedients may be employed such as constructing the wedges of powdered metal such as sintered bronze or the like to facilitate the wearing characteristics and lubrication characteristics of the structures to enable a highly accurate structure to be provided and also one which is long-lasting and substantially free of expensive maintenance.

In both embodiments of the invention, the springs serve not only to urge the lowermost bearing assembly or wedges upwardly into engagement with an interior conical bearing surface on the spindle or depending pin on the anchor bracket but also to urge the housing whether it be an integral part of the idler arm or a separate housing attached to an idler arm downwardly in relation to the pin so that the upper wedges are brought into engagement with respective interior bearing surfaces 174 and external engaging surface 180. Thus, the resilient springs in each instance serve to take-up wear between the cooperating bearing surfaces between the pin and the wedge elements or assemblies and also enables limited relative longitudinal movement between the components to take up wear and also absorb shock loads imparted to the components and, of course, the structure provides for the necessary relative pivotal movement of the idler arm in relation to a vehicle frame.

FIGURE 7 illustrates an embodiment of the invention similar to that of FIGURE 5 and which is designated generally by numeral 240. In this construction, the pivotal connection for the bracket end of the idler arm includes a tubular housing 242 provided with a bore 244 extending therethrough which is cylindrical in the lower portion and provided with a continuously and converging internal upper end portion 246 for receiving upper wedge elements 248 having the lower end thereof engaged by a washer 250, a cup-shaped retainer 252 and a pair of split spring rings 254 received in an annular groove 256 in a pin 258 which has the upper portion thereof cylindrical and which has a lower portion thereof continuously tapering as at 259. A lower set of segmental wedge elements 260 are orientated in the cylindrical lower end portion of the bore 244 and have internal cooperating surfaces which cooperate with the tapered end 259 of the pin 258. The aforedescribed structure is the same as that specifically described in conjunction with FIGURE 5.

The lower end of the pin 258 is provided with a projection 262 of substantially cylindrical construction and of considerably less cross-sectional area than the lower end of the pin 258. Encircling and guided by the projection 262 which is in the form of a projecting pin is a compression coil spring 264 which closely encircles the projecting pin 262 and is mounted and guided thereby with the spring 264 having a normal length greater than the length of the projecting pin 262 with the inner end of the spring 264 engaging the shoulder 266 formed by the lower end of the pin 258 where the projecting pin 262 joins thereto. The outer end of the coil compression spring 264 is engaged by and retained under compression by a retaining cap 268 which is retained in position by a portion of the body or housing 244 being swedged over the periphery of the cap 268 as at 270 which is the same manner of retaining the cap 218 in position in FIGURE 5. The cap 268 also retains a spiral coil compression spring 272 in compressed relation with the smaller outer end thereof engaging the interior surface of the cap 268 and the larger upper end thereof engaging an annular washer 274 which rests against the lower ends of the wedge elements 260 and is provided with a downturned peripheral edge 276 for retaining the spring 272 in engagement with the washer 274 thus enabling the spring 272 to exert spring forces on the lower ends of the lower segmental wedge elements 260 while the spring 264 independently of the spring 272 exerts spring forces on the pin 258 and on the cap 268 thus urging the outer tapering surfaces of the upper wedge elements 248 into cooperating engagement with the inner tapering surface 246 of the upper portion of the bore 244.

FIGURES 8–10 illustrate another embodiment of the pivotal connection at the anchor end or bracket end of the idler arm which is designated generally by numeral 280. In this form of the invention, the pin is designated by numeral 282 and has an elongated shank 284 as compared with the pins illustrated in the other figures of the drawings for extending through aligned apertures 286 on a frame element 288 of a vehicle frame. While a box-shaped frame element 288 has been illustrated, the frame element may be channel-shaped or any other suitable configuration with the shank 284 of the pin 282 extending vertically therethrough with one end of the shank 284 having a rigid collar 290 engaging the lower surface of the frame element 288 and the upper end thereof having a threaded portion 292 receiving a nut and washer assembly 294 for rigidly but detachably anchoring the pin 282 to the frame 288. This structure is primarily for installations in which the pivotal axis of the idler arm bracket is disposed directly in alignment with a component of the vehicle frame 288.

In this construction, the idler arm housing 296 is provided with a cylindrical bore 298 having an outwardly and continuously tapering lower end portion 300. The pin 282 has a lower cylindrical portion 302 and an upper inwardly and continuously tapering portion 304. A resilient dust seal 306 is provided between the shoulder 290 and the upper end of the housing 296 and an O-ring seal 308 is provided at the upper end of the housing 296 where the pin 282 extends upwardly through an opening in the upper end of the housing 296. The lower end of the bore 298 through the housing 296 is provided with a closure cap 310 retained in position by any suitable means such as by swedging at 312. Depending from the lower end of the cylindrical portion 302 of the pin 282 is a projecting pin 314 having a spring 316 closely encircling the same and being of cylindrical spiral construction and longer than the pin 214 to exert spring force axially of the pin 282. A spiral coil spring 318 is disposed against the cap 310 and has its lower smaller end in encircling relation to the lower end of the spring 316 and the upper larger end thereof engaged with an annular washer 320 with this structure being similar to that illustrated in the lower end portion of FIGURE 7.

In the cylindrical upper portion of the bore 298 in the housing 296, there is provided a wedge assembly which is illustrated in the form of an annular wedge element 322 having planar upper and lower surfaces 324 and 326 and an external surface which is substantially cylindrical and is designated by the numeral 328 with the external cylindrical surface having a slight draft or taper with the smaller end of the external surface 328 being at the upper end thereof. As illustrated in FIGURE 10, the draft or taper is 3° although this may vary depending upon manufacturing techniques and requirements. This draft enables the annular bearing element 322 to be inserted into the bore 298 and easily forced into the cylindrical upper portion thereof by employing a relatively small force.

The internal surface of the annular bearing element 322 is designated by numeral 330 and is continuously and inwardly varying upwardly which cooperates with the varying surface 304. The internal surface 330 is provided with a plurality of notches or grooves 322 extending throughout the length thereof which provide spaced areas of contact between the tapered pin surface 304 and the cooperating inner surface 330 of the annular bearing element 322 and also provides for passage of lubricating material and also serves as a collecting area for metallic particles or other particles which may be disposed between the cooperating and contacting surface areas on the pin and wedge element thus retaining the contacting areas clean and well lubricated.

A lower wedge assembly is disposed in the lower tapering or varying surface area 300 of the bore 298 and this wedge assembly includes a plurality of separate or segmental wedge elements 334 which have an inner cylindrical surface for cooperating engagement with the cylindrical portion 302 of the pin 282 and an external varying surface 336 for cooperating contacting engagement with the varying internal surface 300 of the bore 298. The interior surface of the wedge elements 334 is designated by numeral 338 and during normal pivotal movement of the housing 296 relative to the pin 282, bearing contact is made between the varying surface area 304 of the pin 282 and the internal cooperating surface 330 of the annular bearing element 322 and between the cylindrical surface 302 of the pin 282 and the internal surface area 338 of the bearing elements 334. The action of the spring 318 is against the segmental bearing elements 334 to take up any wear which occurs between the wedge elements 334 and the cylindrical surface 302 of the pin 282 while the spring 316 exerts axial pressure to take up any wear which occurs between the varying surface 304 of the pin 282 and the internal surface 330 of the annular bearing element 322.

FIGURES 11 and 12 illustrate a structure similar to that illustrated in FIGURES 8–10 with the exception that the pin 282' is relatively short and provided with a relatively short tapered or varying surface 340 for reception and anchoring in a corresponding tapered mounting bore in a supporting structure (not shown). A threaded end 342 is employed on the pin 282' for anchoring the pin 282' on a suitable support. Other than this difference, the structure is the same as that set forth in detail in conjunction with FIGURES 8–10 and the same reference numerals are applied to FIGURES 11 and 12 where the structure is identical.

In each form of the invention, the bearing contact occurs on the exterior surface of the male member, pin or spindle forming part of the anchor bracket whereas the wedging contact occurs between the wedges, wedge means or wedge members and the internal surface of the bore formed in the housing whether the housing be of one-piece or of multiple pieces as illustrated in FIGURES 1–3. Also, when the wedges are in wedging contact with the surfaces of the bore, they will be rotatably fixed or stationary in relation to the bore. Where both wedge means are in the form of a plurality of independent wedges of arcuate cross-section, a limited degree of movement may occur upon application of shock loads, impact or the like but the springs associated therewith in each instance will immediately return the wedge means so that the wedging contact will exist between the wedge means and the interior surfaces of the bore. In the embodiment of the invention using one annular ring as one of the wedge means, the annular ring, of course, is permanently fixed into the bore and of course is rotatably fixed in relation thereto.

The provision of a single conical or diametrically varying surface on the male member or pin facilitates the manufacture of the pin by employing a cold heading procedure which will form a conical or tapering surface of sufficient precision to eliminate the necessity of finish grinding of the male member or pin. This construction also eliminates the problem of the bearing contacts binding or jamming since the longitudinal axis of the pin will form the axis of the cylindrical bearing contact or surface and also the conical bearing of contact or surface. The employment of independent springs enables the two springs to be lighter inasmuch as the two springs enable a portion of the loads encountered to be more equally absorbed as compared with using a single heavy spring. The use of the single annular member as one of the wedges provides a simple assembly technique in that no particular specialized tools are required to assemble the annular member and no particular excessive pressures are necessary to force the annular member into the bore.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. In combination with an idler arm, an anchor end pivotal connection comprising a male member having, axially spaced, a cylindrical bearing surface and a conical bearing surface; a female housing including a bore having, axially spaced, a conical surface and a cylindrical surface; a first wedge means having an outer surface contacting the conical surface of said bore and rotatably stationary with respect thereto and an inner bearing surface contacting the cylindrical surface of the male member for rotation of the male member thereagainst; a second wedge means axially spaced from said first wedge means having an outer surface contacting the cylindrical surface of said bore and rotatably stationary with respect thereto and an inner bearing surface contacting the conical surface of the male member for rotation of the male member thereagainst; at least one of said first wedge means and said second wedge means being movable axially with respect to said bore, and a spring means urging the movable wedge means axially with respect to said other wedge means, each of the wedge means including a plurality of circumferentially arranged wedges of arcuate cross-section with the wedges having internal bearing surfaces, and means retaining one set of wedges fixed longitudinally of the male member so that upon relative movement of the housing in relation to the male member, the wedges will be retained in position, the means for retaining said one set of wedges in position including a groove in the male member, an annular member engaging one end of the wedges, and a spring retainer engaging the groove and the annular member for resiliently supporting the wedges from the groove.

2. The combination of claim 1 wherein said housing has an externally threaded lower end portion adapted to extend through the anchor end of an idler arm, a retaining nut on said threaded portion for retaining the idler arm anchor end on said housing.

3. A steering linkage idler arm comprising at the frame bracket end:
  (1) a housing having a bore with, axially spaced, cylindrical upper surface and a diametrical varying surface;
  (2) an anchor bracket including a pin extending axially into said bore, with axially spaced, a diametrically varying upper bearing surface and a cylindrical lower bearing surface;
  (3) an upper wedge means having an exterior surface in rotatably fixed wedging contact with the upper surface of said bore and an inner surface in bearing contact with the upper bearing surface of said pin;
  (4) a lower edge means axially spaced from said upper wedge means and having an exterior surface in rotatably fixed wedging contact with the lower surface of said bore and an inner surface in bearing contact with the lower bearing surface of said pin; and
  (5) resilient means continuously urging both said bearing contacts and at least one of said wedging contacts whereby looseness caused by wear, imprecision and shock are automatically eliminated, at least one of said wedge means including a plurality of arcuate wedges oriented circumferentially of the bore, said resilient means biasing said wedges into wedging contact and bearing contact, said resilient means including a pair of independent springs, one of said springs biasing the plurality of wedges, the other of said springs biasing the bearing contact of the other of said wedge means independent of the spring biasing the wedges, the other of said wedge means including an annular member of wedge-shaped cross-section, said annular member being received in the cylindrical upper surface of the bore, the external surface of the annular member being substantially cylindrical and provided with a slight draft to facilitate insertion of the annular member into the bore.

4. A steering linkage idler arm comprising at the frame bracket end:
  (1) a housing having an axial bore with a cylindrical surface and a varying tapering surface axially spaced therein,
  (2) an anchor bracket including a pin that extends into said bore and includes a cylindrical bearing surface and a varying inwardly tapering bearing surface arranged axially and with a common axis,
  (3) a pair of axially spaced wedge means,
  (4) said wedge means having biasing contact with the bearing surfaces on the pin and contact with the surfaces in the bore, and (5) spring means biasing the wedge means into operative position against the bearing surfaces on the pin and at least one of the wedge means against a surface in the bore,
(6) one of said wedge means including a plurality of circumferentially arranged arcuate wedges,
(7) said spring means including a first coil spring biasing said arcuate wedges into operative position against the bearing surface on the pin and against the surface in the bore,
(8) said spring means including a second coil spring biasing the pin and housing axially to bias the other wedge means, and bearing surface on the pin into bearing contact.

5. The structure as defined in claim 4 wherein:
(1) said first coil spring and second coil spring are disposed at the same end of the pin,
(2) said second coil spring being disposed concentrically within the first coil spring,
(3) said pin having a reduced axial extension received in said second coil spring.

6. A steering linkage idler arm comprising at the frame bracket end:
(1) a housing having a bore with, axially spaced, cylindrical surface and a diametrical varying surface;
(2) an anchor bracket including a pin extending axially into said bore with, axially spaced, a diametrically varying bearing surface and a cylindrical bearing surface;
(3) a first wedge means having an exterior surface in rotatably fixed wedging contact with the cylindrical surface of said bore and an inner surface in bearing contact with the varying bearing surface of said pin;
(4) a second wedge means axially spaced from said first wedge means and having an exterior surface in rotatably fixed wedging contact with the cylindrical surface of said bore and an inner surface in bearing contact with the varying bearing surface of said pin; and
(5) resilient means continuously biasing both said bearing contacts and at least one of said wedging contacts whereby looseness caused by wear, imprecision and shock are automatically eliminated, at least one of said wedge means including a plurality of arcuate wedges oriented circumferentially of the bore, said resilient means biasing said wedges into wedging contact and bearing contact, the surfaces on the wedge means varying inwardly in the same longitudinal direction and said resilient means also biases the pin axially of the bore, the bearing contact between the first wedge means and the pin varying inwardly diametrically whereby the bias on the pin will take up looseness between the pin and first wedge means, said resilient means including a pair of springs disposed at one end of said bore, one spring exerting force solely on the second wedge means, the other spring exerting force solely on the pin.

References Cited
UNITED STATES PATENTS

| | | | |
|---|---|---|---|
| 1,568,334 | 1/1926 | Hubbard | 308—70 |
| 2,418,219 | 4/1947 | Bley | 308—70 |
| 2,660,906 | 12/1953 | French | 280—95 X |
| 2,913,251 | 11/1959 | Herbenar | 308—71 X |
| 2,974,975 | 3/1961 | Thomas. | |
| 3,044,798 | 7/1962 | Gerner | 308—71 X |

FOREIGN PATENTS

| | | |
|---|---|---|
| 1,026,004 | 4/1966 | Great Britain. |

MARTIN P. SCHWADRON, *Primary Examiner.*

R. F. HESS, *Assistant Examiner.*